US012798136B2

(12) United States Patent
Blaszczyk et al.

(10) Patent No.: US 12,798,136 B2
(45) Date of Patent: Nov. 17, 2026

(54) CUTTING BLADE ASSEMBLY

(71) Applicant: Fives Machining Systems, Inc., Fond du Lac, WI (US)

(72) Inventors: Stanislaus J. Blaszczyk, Alexandria, KY (US); Jeffrey C. Roberts, Arlington Heights, IL (US); Jeffrey Taylor, Schaumburg, IL (US); Rakesh N. Patel, Elk Grove Village, IL (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 1350 days.

(21) Appl. No.: 16/331,652

(22) PCT Filed: Oct. 24, 2017

(86) PCT No.: PCT/US2017/058009
§ 371 (c)(1),
(2) Date: Mar. 8, 2019

(87) PCT Pub. No.: WO2018/081067
PCT Pub. Date: May 3, 2018

(65) Prior Publication Data

US 2022/0274276 A1 Sep. 1, 2022

Related U.S. Application Data

(60) Provisional application No. 62/414,213, filed on Oct. 28, 2016.

(51) Int. Cl.
*B26D 1/04* (2006.01)
*B26D 7/26* (2006.01)

(52) U.S. Cl.
CPC *B26D 1/04* (2013.01); *B26D 7/26* (2013.01)

(58) Field of Classification Search
CPC ...... B26D 7/2614; B26D 1/00; B26D 1/0006; B26D 1/04; B26D 1/045; B26D 1/26; B26D 1/2607; B26D 1/2614
(Continued)

(56) References Cited

U.S. PATENT DOCUMENTS 630,681 A * 8/1899 Gillmen ............... B23D 35/002 83/699.11
1,834,391 A * 12/1931 Edmunds ................ E02F 9/285 D15/29
(Continued)

FOREIGN PATENT DOCUMENTS

CN 101209499 A 7/2008
JP H06126698 A 5/1994
(Continued)

OTHER PUBLICATIONS

International Search Report for PCT/US17/58009 filed on Oct. 26, 2017, mailed on Feb. 2, 2018.
(Continued)

*Primary Examiner* — Ghassem Alie
*Assistant Examiner* — Richard D Crosby, Jr.
(74) *Attorney, Agent, or Firm* — CUSHMAN PARTNERS LLC

(57) ABSTRACT

A cutter assembly for use in a composite placement machine has a holder having a mounting surface for mounting a cutting insert. A first foot and a second foot is formed on the mounting surface, and a first leg extends between the first and second feet. A first step and a second step is formed on the cutting insert and a first rise extends between the first and second steps. When the cutting insert is mounted in the holder the two feet contact the two steps and the first leg is in contact with the first rise to form a surface area of contact between the mounting surface and the cutting insert that is
(Continued)

greater than the surface area of contact between the two feet and the two steps.

18 Claims, 2 Drawing Sheets

(58) Field of Classification Search
USPC .......................................................... 83/699.11
See application file for complete search history.

(56) References Cited

U.S. PATENT DOCUMENTS

| | | | | | |
|---|---|---|---|---|---|
| 2,084,993 | A * | 6/1937 | Aff | B26D 7/2614 83/699.41 |
| 2,098,159 | A * | 11/1937 | Peiseler | B23D 35/005 83/699.41 |
| 2,285,039 | A * | 6/1942 | Lowe | E02F 3/8152 172/701.3 |
| 3,148,575 | A * | 9/1964 | Thyng | B26D 7/2628 83/699.41 |
| 3,496,823 | A * | 2/1970 | Kruse | B23D 35/002 83/699.11 |
| 3,685,177 | A * | 8/1972 | Hahn | E02F 9/2816 37/446 |
| 3,882,594 | A * | 5/1975 | Jackson | E02F 9/285 228/122.1 |
| 4,501,079 | A * | 2/1985 | Hahn | E02F 9/2841 24/456 |
| 4,667,713 | A * | 5/1987 | Wright | B23C 5/2265 144/241 |
| 4,887,772 | A | 12/1989 | Robinson et al. | |
| 4,942,798 | A * | 7/1990 | Taub | B23D 35/001 83/636 |
| 5,231,908 | A * | 8/1993 | Skvarce | B23D 21/00 403/348 |
| 5,485,873 | A | 1/1996 | Crammond | |
| 6,041,529 | A * | 3/2000 | Ruvang | E02F 9/2833 172/772 |
| 6,960,049 | B2 * | 11/2005 | Inayama | B23B 27/08 407/103 |
| 11,565,436 | B2 * | 1/2023 | McCracken | B26D 7/01 |

FOREIGN PATENT DOCUMENTS

| | | |
|---|---|---|
| JP | 2504317 | 4/1996 |
| JP | 3074431 U | 1/2001 |
| JP | 3101353 U | 6/2004 |
| WO | 2015164901 A1 | 11/2015 |

OTHER PUBLICATIONS

Korean Office Action for KR Pat. App. No 10-2019-7009542, dated Jun. 8, 2020.
Chinese Decision of Rejection for Chinese Application No. 201780066798.1 dated Aug. 24, 2021 (8 pages).
English Translation of Chinese Decision of Rejection for Chinese Application No. 201780066798.1 dated Aug. 24, 2021 (10 pages).
Office action mailed on Jul. 20, 2020 for corresponding patent application in Japan, JP Pat. App. No. 2019-525075.
Office action dated Apr. 22, 2020 for corresponding patent application in China, CN Pat. App. No. 20178006679811 filed on Oct. 24, 2017.
European Office Action for European Application No. 17865694.8 dated Dec. 20, 2022 (6 pages).

* cited by examiner

CUTTING BLADE ASSEMBLY

CROSS-REFERENCE TO RELATED APPLICATIONS

This application claims the benefit of priority from International Patent Application No PCT/US17/58009 filed on Oct. 26, 2017 and U.S. Provisional Patent Application No. 62/414,213 filed Oct. 28, 2016, the entire contents of which are hereby incorporated by reference.

FIELD OF THE DEVICE

The device relates to a high performance cutting bade assembly for use in composite placement machines in which the composite material is cut while it is moving relative to the blade assembly.

BACKGROUND

Traditional high performance bi-metallic cutting blade assemblies in composite placement machines utilize a steel mounting body and harder carbon or diamond compound cutting insert brazed together with a butt or lap joint to bond the two materials together. Failures can occur along the bond line when the joint is subjected to cutting forces. Such failures are most likely to occur in cutting applications in which the material is being cut while it is moving normal to the cutting insert. After a certain number of cuts, the cutting inert becomes dull and needs to be replaced.

It would be desirable to have a bi-metallic cutter assembly that can be subjected to high cutting forces normal to the bond line between a cutting insert and a holder.

It would further be desirable to have a bi-metallic cutter assembly in which the cutting insert could be re-sharpened after becoming dull from use.

DESCRIPTION OF THE PREFERRED EMBODIMENT

Figure 1:
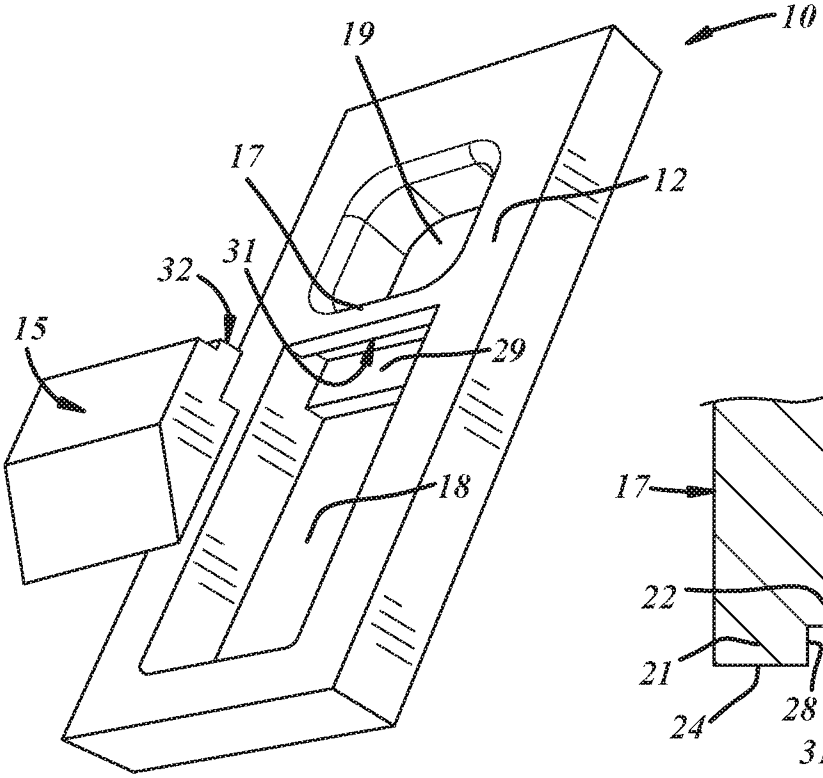
FIG. 1 is an exploded perspective view of a cutter assembly.

Turning now to the drawing figures, FIG. 1 is an exploded perspective view of a cutter assembly 10. The cutter assembly 10 may be used in a composite placement machine to cut composite material that is being laid onto an application surface. The cutter assembly 10 comprises a metal holder 12 and cutting insert 15 that may be attached to the holder 12. The metal holder 12 may be formed from a ductile material such as carbon steel, and the cutting insert 15 may comprise a blade formed from a material that is harder than the holder 12 and can be brazed to the holder 12. The cutting insert 15 may be formed from carbide or diamond compound material such as poly-crystalline diamond (PCD), or may be formed from other materials which are coated with PCD or other hard coatings. Commercially available coatings such as, but not limited to, titanium nitride (TiN), TiALN, CrN, TiC, TiCN, AL203, CBN, tungsten carbide, physical vapor deposited diamond (PVD), and chemical vapor deposited diamond (CVD) may be used. Other materials may be used for the holder 12 and the cutting insert 15.

The holder 12 includes a beam 17 which extends from one side of the holder 12 to the other. A first window 18 is formed on one side the beam 17 and a second window 19 is formed on the other side the beam. Other forms and shapes of holders may be used. The cutting insert 15 may be mounted on the beam 17 so that it extends into the first window 18. A leg 29 is formed on the lower portion of the beam as described more fully below. The leg 29 provides lateral support for the insert 15 when it is mounted on the beam 17. An actuator such as a lever, not shown, may engage the second window 19 to drive the cutter assembly in an up-and-down motion as required for the operation of the cutting assembly in a composite placement machine. Other methods of actuation may be used.

Figure 2:
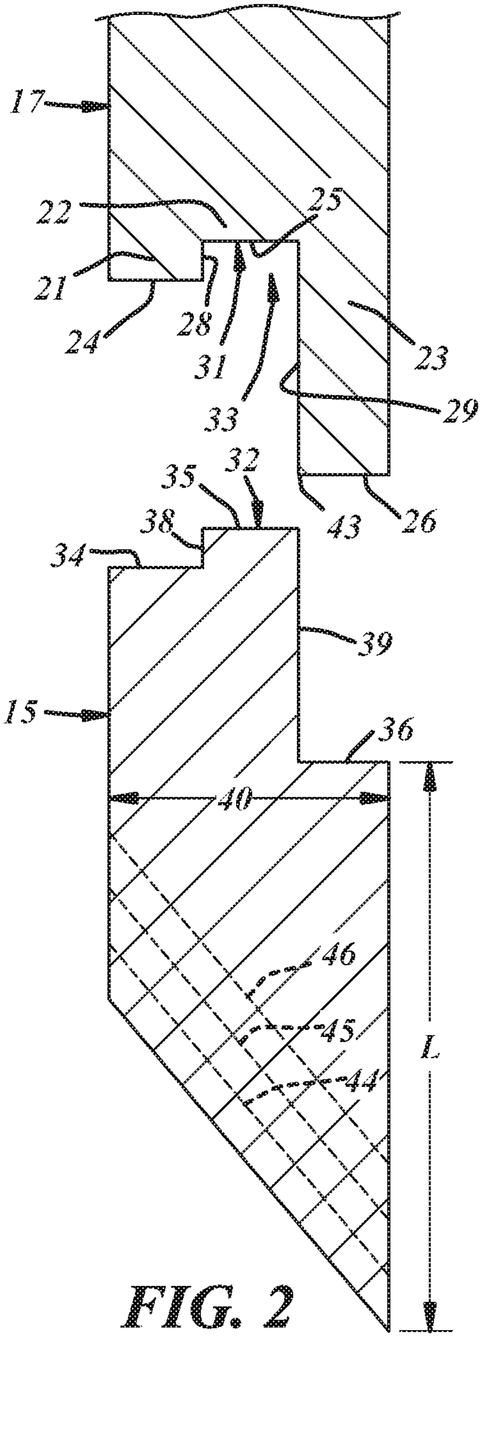
FIG. 2 is an exploded sectional view of the labyrinth joint used in a cutter assembly.

FIG. 2 is an exploded sectional view of a labyrinth joint used in the cutter assembly 10. The labyrinth joint 20 may comprise a hook profile 31 on the beam 17, and a step profile 32 on the insert 15. The hook profile 31 on the beam 17 may form a mounting surface 33 for the cutting insert 15, and comprises a bite portion 21, a bend portion 22, and a shank portion 23. The bite portion 21 may have a first foot 24 formed on the end thereof, the bend portion 22 may have a second foot 25 formed on the inside surface thereof, and the shank portion 23 may have a third foot 26 formed on the end thereof. The second foot 25 on the bend portion 22 is higher than the first foot 24 and the third foot 26, and the first foot 24 on the bite portion 21 is higher than the third foot 26 on the shank portion 23. A first leg 28 extends from the first foot 24 to the second foot 25 on the beam 17, and a second leg 29 extends from the second foot 25 to the third foot 26 on the beam. The second leg 29 is longer than the first leg 28. The widths of the three feet 24, 25, and 26 are approximately equal to one another. The first and second legs 28 and 29, respectively, on the mounting surface 33 are parallel to one another and are perpendicular to the first, second, and third feet 24-26, respectively. A corner or lowermost fulcrum point 43 is formed where the lower end of the second leg 29 meets the left end of the third foot 26.

The hook profile 31 on the beam 17 engages and mates with the step profile 32 on the insert 15 which includes a first step 34, a second step 35, and a third step 36. The first step 34 on the insert is lower than the second step 35, and the first step 34 is higher than the third step 36. The third step 36 is lower than the second step 35. A first rise 38 on the insert 15 extends from the first step 34 to the second step 35, and a second rise 39 on the insert extends from the second step 35 to the third step 36. The second rise 39 is greater than the first rise 38. The widths of the three steps 34, 35, and 36 are approximately equal to one another. The first rise 38 and the second rise 39 are parallel to one another, and the first step 34, the second step 35 and the third step 36 are perpendicular to the first rise 38 and the second rise 39.

The three feet 24-26 on the beam 17 mate with the three steps 34-36 on the insert. The combined width of the three feet 24-26 on the beam is equal to the combined width of the three steps 34-36 on the insert, and may be equal to the thickness 40 of the cutting insert. The length of the first rise 38 and the second rise 39, when added together, is greater than the thickness 40 of the cutting insert 15.

The cutting insert 15 has a length L measured from the third step 36 to the bottom of the cutting insert 15, whereby the length of the cutting insert 15 allows the cutting insert to be re-sharpened at least three times before the cutting insert needs to be replaced. Dotted lines 44-46 show the approximate profile of the cutting insert 15 after first, second, and third re-sharpening, respectively.

Figure 3:
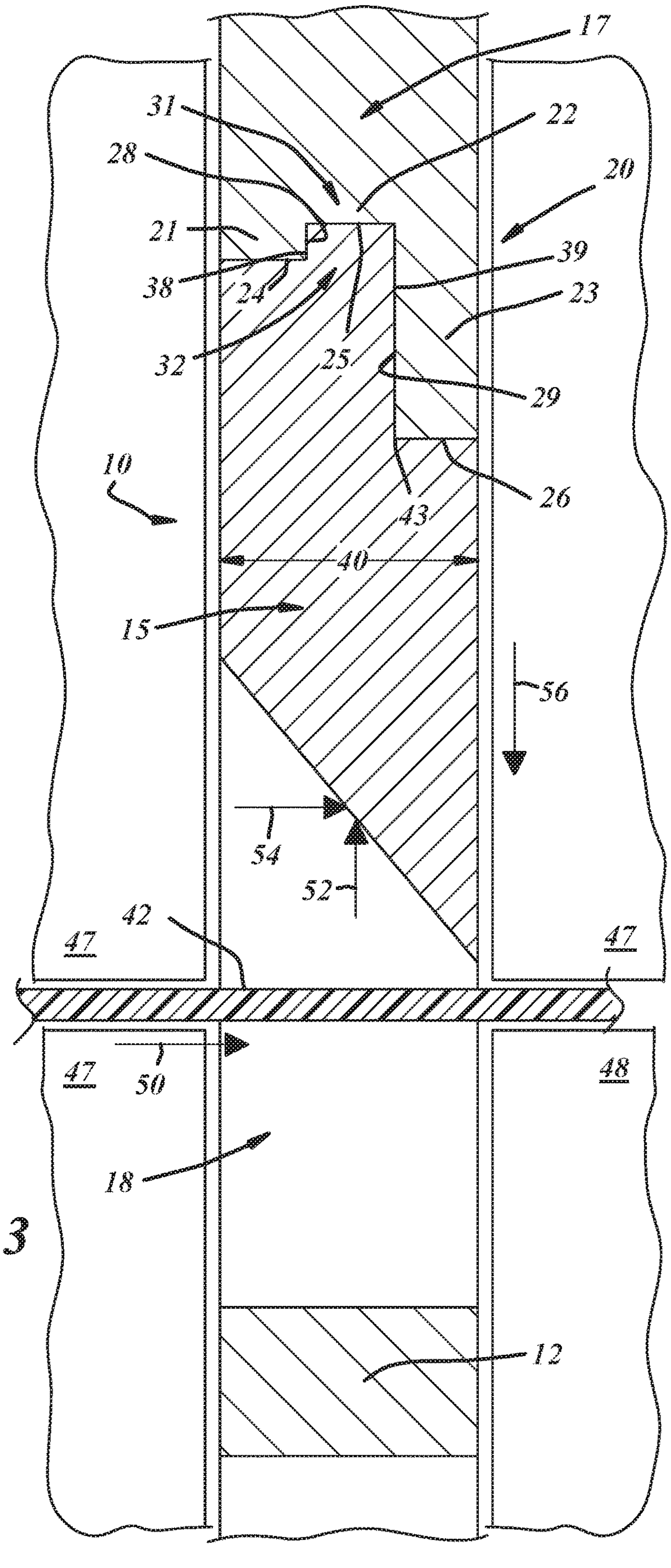
FIG. 3 is a side sectional view of a cutter assembly.

FIG. 3 is a side sectional view of a cutter assembly 10 in a composite placement machine 47. The labyrinth joint 20 allows for bi-directional support of the cutting insert 15 on the beam 17 of the holder 12 when it is used in a composite placement machine 47. The labyrinth joint 20 is formed by the three feet 24-26 on the beam 17, the three steps 34-36 on the insert 15, and the contact between the first leg 28 on the beam 17 with the first rise 38 on the insert, and the contact between the second leg 29 on the beam with the second rise 39 on the insert 15. The labyrinth joint 20 allows the bite portion 21 of the hook to engage the first rise 38 on the cutting insert 15 to prevent rocking motion of the insert 15 relative to the beam 17. The shank portion 29 of the hook profile 31 on the beam 17 abuts against the second rise 39 on the cutting insert 15 to prevent lateral motion of the insert 15 relative to the beam 17.

The cutting insert 15 may be brazed in place on the beam 17 of the mounting body 12. The labyrinth joint 20 presents a larger surface area for the purpose of increasing the braze/bonding strength between the cutting insert 15 and beam 17. The first rise 38 on the insert 15 between the first step 34 and second step 35, and the second rise 39 between the second step 35 and third step 36 more than doubles the surface area contact between the insert 15 and the beam 17 compared to the area contact between the horizontal surfaces of the steps 34-36 and the feet 24-26 alone. This provides increased surface area for brazing material to bond the cutting insert 15 and the beam 17 together, and as a result an increased brazing bond is formed compared to the brazing bond between the first, second, and third feet 24-26 with the first, second, and third steps 34-36.

In use, one or more of the cutter assemblies 10 may be mounted in a composite placement machine 47 to apply composite material 42 onto an application surface. Each cutting assembly 10 operates in conjunction with an anvil 48 by being driven in a cutting direction 56 to sever composite material 42 as the material is delivered to the application surface. The labyrinth joint 20 for the cutting insert 15 provides a high integrity joint between the insert 15 and the beam 17 by providing lateral mechanical support for the cutting insert 15 during the cut. As shown in FIG. 3, the composite material 42 may be driven in a material direction 50, from left to right, beneath the cutting insert 15. The cutting insert 15 may cut the composite material 42 while it is moving at speeds from 500 to 1900 inches per minute through the cutting assembly 10.

The movement of the composite material 42 in the material direction 50 as it is being cut exerts an upward force 52 on the cutting insert 15 that is opposite to the cutting direction 56 and a rightward lateral force 54 that is parallel to the material direction as shown in FIG. 3. The upward force 52 is opposed by the abutment of the first, second, and third feet 24-26 of the beam 17 against the first, second, and third steps 34-36 on the cutting insert 15. Lateral motion of the cutting insert 15 in response to the lateral force 54 is opposed by the abutment of the second rise 39 of the insert with the second leg 29 of the beam 17. The rightward lateral force 54 also creates a rocking or pivoting force on the insert 15 about the lowermost fulcrum point 43 on the shank portion 23 of the beam 17 that tends to rotate or rock the upper portion of the insert 15 to the left, away from the beam 17. The rocking movement of the cutting insert 15 around the lowermost fulcrum point 43 is prevented by the engagement of the first rise 38 of the insert with the bite portion 21 of the beam 17, and specifically by the abutment of the first rise 38 of the insert against the first leg 28 of the beam 17.

Having thus described the device, various modifications and alterations will occur to those skilled in the art, which modifications and alterations will be within the scope of the device as defined by the appended claims.

The invention claimed is:

1. A cutter assembly for cutting composite material in a composite placement machine, the cutter assembly comprising:

a holder, formed from a first material, having a beam which extends from one side of the holder to the other;

a cutting insert, formed from a second, different material, that is brazed to the holder, and having a first step, a second step, and a third step; and the beam having on one side a first window and a first foot, a second foot, and a third foot formed along the top of the first window, wherein a mounting surface for the cutting insert is formed on the beam at a labyrinth joint, where the first step, the second step, and the third step of the cutting insert mate with the first foot, the second foot, and the third foot of the beam.

2. The cutter assembly of claim 1 wherein a surface area of contact between the mounting surface and the cutting insert is greater than the combined surface area of contact between the first foot and the first step and the second foot and the second step.

3. The cutter assembly of claim 2 further comprising:

a lowermost fulcrum point formed on a corner of the second leg and the third foot of the mounting surface, whereby a rocking movement of the cutting insert around the lowermost fulcrum point is prevented by the contact of the first rise of the insert with the first leg of the mounting surface.

4. The cutter assembly of claim 2 further comprising:

an abutment of the second rise of the insert against the second leg of the mounting surface, wherein motion of the cutting insert in a direction perpendicular to a cutting direction of the holder and the cutting insert is prevented by the abutment.

5. The cutter assembly of claim 1 wherein the surface area of contact created by the labyrinth joint is more than twice the combined surface area of contact between the first, second and third feet of the mounting surface and the first, second, and third steps of the insert.

6. The cutter assembly of claim 1 wherein a first rise and a second rise on the cutting insert are parallel to one another and are perpendicular to the first, second and third steps on the cutting insert.

7. The cutter assembly of claim 1 wherein first and second legs on the mounting surface are parallel to one another and are perpendicular to the first, second, and third feet on the mounting surface.

8. The cutter assembly of claim 1 wherein a first rise has a length measured from the first step to the second step, and a second rise has a length measured from the second step to the third step, wherein the length of the first rise and the second rise, when added together, is greater than the thickness of the cutting insert.

9. A cutter assembly for cutting composite material in a composite placement machine while the composite material is moving relative to an anvil through the machine, the cutter assembly comprising:

a holder, formed from a first material, having a beam which extends from one side of the holder to the other;

a cutting insert, formed from a second, different material, that is brazed to the holder and having a first step, a second step, and a third step, for cutting a composite material through a composite placement machine while the anvil moves perpendicular to the composite material; and the beam having on one side a first window and a first foot, a second foot, and a third foot formed along the top of the first window, wherein a mounting surface for the cutting insert is formed on the beam at the labyrinth joint, where the first step, the second step, and the third step of the cutting insert mate with the first foot, the second foot, and the third foot of the beam, and whereby the holder and the cutting insert are driven in a cutting direction to cut the composite material against the anvil moving perpendicular to movement of the composite material through the machine.

10. The cutter assembly of claim 9 whereby the movement of the composite material through the machine is perpendicular to the cutting direction and the composite material exerts a lateral force on the cutting insert which is perpendicular to the cutting direction.

11. The cutter assembly of claim 9 wherein a surface area of contact between the mounting surface and the cutting insert that is greater than the combined surface area of contact between the first foot and the first step and the second foot and the second step.

12. The cutter assembly of claim 11 further comprising:

a lowermost fulcrum point formed on a corner of the second leg and the third foot of the mounting surface, whereby cutting of composite material while it is moving through the machine creates a lateral force on the cutting insert, and a rocking movement of the cutting insert around the lowermost fulcrum point is prevented by the contact of the first rise of the insert with the first leg of the mounting surface.

13. The cutter assembly of claim 12 wherein the lateral force on the cutting insert is opposed by the contact of the second rise of the insert against the second leg of the mounting surface.

14. The cutter assembly of claim 11 whereby the upward force on the cutting insert is opposed by the first, second, and third feet on the mounting surface against the first, second, and third steps on the insert.

15. The cutter assembly of claim 11 wherein the labyrinth joint provides an increased surface area for bonding the cutting insert and a beam together, whereby an increased bond is formed compared to a bond formed between the first, second, and third feet of the holder, and the first, second, and third steps of the insert.

16. The cutter assembly of claim 15 further comprising:

a brazing bond coupling the cutting insert to the holder.

17. The cutter assembly of claim 9 whereby the movement of the composite material through the machine perpendicular to the cutting direction exerts an upward force on the cutting insert which is parallel and opposite to the cutting direction.

18. The cutter assembly of claim 9 wherein the cutting insert may cut the composite material while it is moving at speeds from 500 to 1900 inches per minute through the composite placement machine.

* * * * *